United States Patent
Kolodner et al.

(10) Patent No.: US 6,675,379 B1
(45) Date of Patent: Jan. 6, 2004

(54) AUTOMATIC REMOVAL OF ARRAY MEMORY LEAKS

(75) Inventors: Elliot Karl Kolodner, Haifa (IL); Ran Shaham, Givat Shmuel (IL); Mooly Sagiv, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 09/609,272

(22) Filed: Jun. 30, 2000

(30) Foreign Application Priority Data

Sep. 7, 1999 (IL) .................................................. 131782

(51) Int. Cl.$^7$ .............................. G06F 9/45; G06F 9/44; G06F 15/00; G06F 7/38
(52) U.S. Cl. ..................... 717/155; 717/118; 717/130; 712/2; 712/227; 712/244
(58) Field of Search ................................. 717/155, 148, 717/118, 130; 712/2, 227, 244; 711/1; 707/104.1

(56) References Cited

U.S. PATENT DOCUMENTS

| | | | | |
|---|---|---|---|---|
| 5,247,632 A | * | 9/1993 | Newman ........................ | 711/1 |
| 5,692,185 A | * | 11/1997 | Nilsen et al. ............. | 707/104.1 |
| 5,842,019 A | | 11/1998 | Kolawa et al. ............. | 717/130 |

FOREIGN PATENT DOCUMENTS

| WO | WO 93/03435 | 2/1993 | ........... G06F/11/34 |
|---|---|---|---|

OTHER PUBLICATIONS

Shaham, R. et al., "Automatic Removal of Array Memory Leaks in Java", *Compiler Construction, 9$^{th}$ International Conference*, CC 2000, Berlin, Germany, Mar. 25–Apr. 2, 2000. Lecture Notes in Computer Science, vol. 1781, pp. 50–66.

Cormen et al, Chapter 25.5, "Algorithms" (MIT Press & McGraw Hill), 1994.

Muchnick, "Advanced Compiler Design and Implementation", Morgan Kaufamann, 1997.

Lindholm et al., "The Java Vertial Machine Specification ," 1997, Chapter 8, pp. 397–414, Addison Wesley Publishers.

Wilson, "Uniprocessor Garbage Collections Techniques", *Proc. of 1992 International Workshop on Memory Management* (Springer–Verlag Lecture Notes in Computer Science).

Nielson et al., "Principles of Program Analysis" (Schloss Dagstuhl, Germany, 1998)–.

Agesen et al., "Garbage Collection and Local Variable Type–Precision and Liveness in Java™ Virtual Machines", *ACM SIGPLAN Conference on Programming Language Design and Implementation*, Montreal, Jun. 1998.

Cousot et al., "Automatic Discovery of Linear Restraints Among Variables of a Program", *Conference Record of the 5$^{th}$ Annual Symposium on Principles of Programming Languages*, Arizona, Jan. 1978.

Liskov, "A History of CLU, HOPL Preprints", 1993.

Reps et al., "Precise Interprocedural Data Flow Analysis via Graph Reachability", Principles of Programming Languages, ACM Press, 1995, p. 49.

Budimlic et al., "Optimizing Java: Theory and Practice", Concurrency: Practice and Experience 9, Jun. 1997.

* cited by examiner

Primary Examiner—Hoang-Vu Antony Nguyen-Ba
(74) Attorney, Agent, or Firm—Darby & Darby

(57) ABSTRACT

A method for memory management in execution of a program by a computer having a memory includes identifying in the program an array of array elements. At a given point in the program, a range of the elements is determined within the array such that none of the elements in the array outside the range is alive at the point. Information regarding the determined range is passed to a memory management function, so that memory locations are associated with the array elements, responsive to the determined range.

58 Claims, 7 Drawing Sheets

FIG. 7
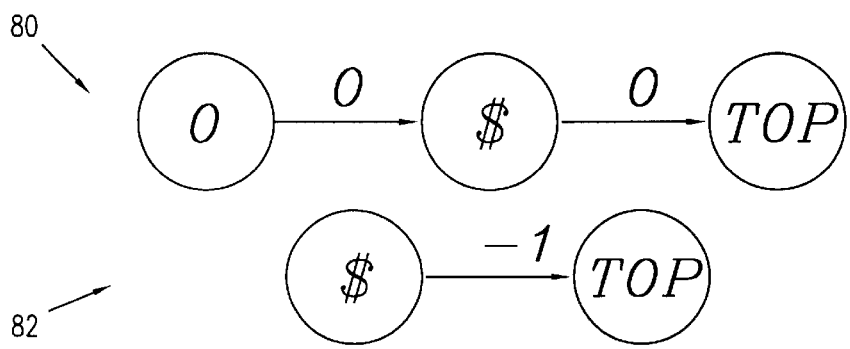
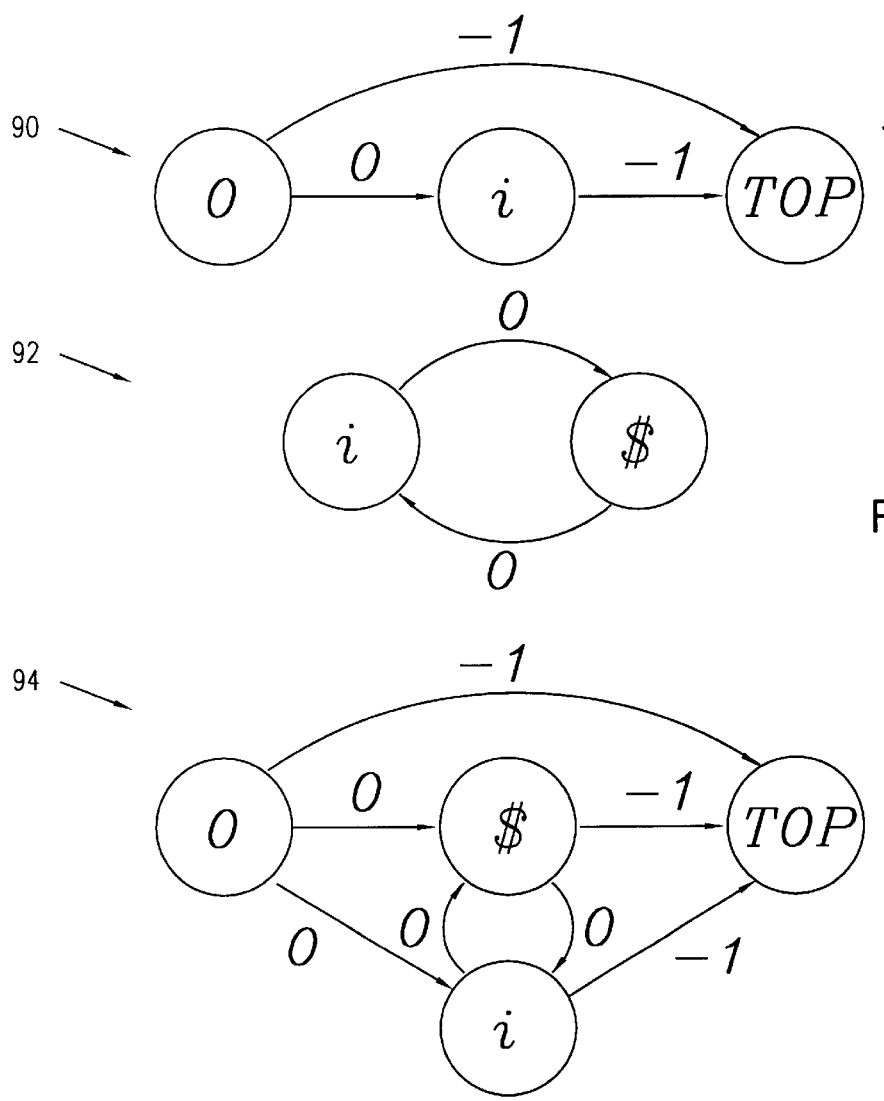
FIG. 8

AUTOMATIC REMOVAL OF ARRAY MEMORY LEAKS

FIELD OF THE INVENTION

The present invention relates generally to efficient use of computer memory in carrying out program instructions, and specifically to methods and apparatus for garbage collection, i.e., for automatic reclamation of unused memory.

BACKGROUND OF THE INVENTION

Programming languages such as Java relieve the programmer of the burden of explicit memory management through the use of automatic garbage collection (GC) techniques that are applied "behind the scenes." Unused data objects, which are not reachable by the running program via any path of pointer traversals, are considered "garbage." GC automatically reclaims computer storage assigned to such objects, in order to free the storage for reuse. This makes programming in garbage-collected languages significantly easier than in C or C++, for example, in which the programmer must include an explicit "free" statement in order to reclaim memory. It allows many run-time errors to be avoided and naturally supports modular programming. A survey of basic GC techniques is presented in an article by Wilson, entitled "Uniprocessor Garbage Collections Techniques," in the proceedings of the 1992 *International Workshop on Memory Management* (Springer-Verlag Lecture Notes in Computer Science), which is incorporated herein by reference.

Run-time GC, as is performed by a Java Virtual Machine (JVM), does not (and in general cannot) collect all the garbage that a program produces. GC typically collects objects that are no longer reachable from a set of root references. However, there are some objects that the program never accesses again, even though they are reachable. Failure to reclaim memory at the proper point may lead to memory "leaks," with unreclaimed memory accumulating until the program terminates or memory space is exhausted. Such leaks may lead to performance slowdown and to the program running out of memory space. Some Java programmers try to circumvent these memory leaks by rewriting their source code, i.e., explicitly assigning "null" to object references that are known not to be used again. Such solutions may lead to erroneous (or even slower) programs and may even be eliminated by optimizing compilers.

For example, a standard Java implementation of a stack data structure is shown in Table I below. (Certain lines in the program are marked "s", "S'" and "s'"" for later reference.) After a successful "pop," the current value of "stack[top]" is not subsequently used. Current garbage collection techniques fail to identify memory leaks of this sort; thus, storage allocated for elements popped from the stack may not be freed in a timely manner.

TABLE I

```
public Class Stack {
    private Object stack[];
    private int top;
    public Stack(int len) {
        stack = new Object[len];
        top = 0;
    }
    public synchronized Object pop() {
        top --;
```

TABLE I-continued

```
s:       return stack[top]; +
     }
     public synchronized void push(Object o) {
s':      stack[top]=o;
         top++;
     }
     public synchronized void print() {
         for (int i=0; i<top; i++) {
s":          System.out.println(stack[i]);
         }
     }
}
```

A typical solution to avoid these memory leaks is to explicitly assign "null" to array elements that are no longer needed. For example, a stack implementation, which avoids these leaks, is shown in Table II below, wherein "null" is explicitly assigned to "stack[top]."

TABLE II

```
public Class Stack {
    private Object stack[];
    private int top;
    public Stack(int len) {
        stack = new Object[len];
        top = 0;
    }
    public synchronized Object pop() {
        Object tmp;
        top --;
        tmp = stack[top];
        stack[top]=null;
        return tmp;
    }
    public synchronized void push(Object o) {
        stack[top]=o;
        top++;
    }
    public synchronized void print() {
        for (int i=0; i<top; i++) {
            System.out.println(stack[i]);
        }
    }
}
```

Explicit solutions of the type shown in Table II have the following drawbacks:

Explicit memory management complicates program logic and may lead to bugs; by trying to avoid memory leaks, a programmer may inadvertently free an object prematurely.

GC considerations are not part of the program logic; thus, they are surely not a good programming practice. In fact, the whole idea of GC-aware programs defeats some of the purposes of automatic GC.

Aiding the memory management task may require knowledge of the GC algorithm, which is implementation-dependent. This may lead to programs that depend on a particular GC algorithm.

The solution of explicitly assigning "null" may slow the program, since such "null" assignments are performed as part of the program flow. For example, consider the method "removeAllElements" of class "java.util.Vector," taken from a Java utilities package called "java.util," offered by Sun Microsystems and shown in Table III below. The only reason for the loop in the method is to allow GC to free the array elements.

An optimizing compiler may deduce that "null" assignment statements have no effect, thus eliminating them.

TABLE III

```
synchronized void removeAllElements() {
    for (int i=0; i < elementCount; i++) {
        elementData[i]= null;
    }
    elementCount=0;
}
```

The above limitations lead to the conclusion that programmers should be freed from dealing with these memory management considerations and that the leaks should be detected by automatic means, such as by compiler analyses.

"Liveness analysis" is a method of data flow analysis that has been developed for use in software optimization and validation. It is described, for example, by Nielson et al., in *Principles of Program Analysis* (Schloss Dagstuhl, Germany, 1998), which is incorporated herein by reference. The analysis is typically performed by tracing the program flow backwards, from end to beginning. A variable is considered "live" before a program point if there exist an execution sequence in the program including the program point and a use of the current value of the variable, such that the program point occurs before the use of the current value of the variable, and the variable is not reassigned before the use.

The use of liveness analysis for garbage collection in Java is proposed by Agesen et al., in an article entitled "Garbage Collection and Local Variable Type-Precision and Liveness in Java™ Virtual Machines," in the proceedings of the *ACM SIGPLAN Conference on Programming Language Design and Implementation* (Montreal, June, 1998), which is incorporated herein by reference. This liveness analysis is applied to references held by local variables and leads to a reduced root set, enabling more memory to be reclaimed. The main benefit found by the authors in using liveness analysis for GC was in "preventing bad surprises." There is no suggestion in the article as to how liveness analysis might be applied to arrays of objects.

Analysis of relationships between variables has been used to analyze array accesses, generally for purposes of parallelizing software compilers and array reference analyses. A precise method for this purpose is described by Cousot et al., in an article entitled "Automatic Discovery of Linear Restraints among Variables of a Program," in the *Conference Record of the Fifth Annual ACM Symposium on Principles of Programming Languages* (Tucson, Ariz., January, 1978), which is incorporated herein by reference. Cousot's method automatically identifies linear relationships between variables by scanning the data flow graph of a program in a forward direction. Analysis of relationships between variables can be extended to detect the minimal and maximal values used as array indices, thus allowing the removal of checks for array bounds violations.

For similar purposes, certain programming languages, such as CLU, provide built-in dynamic arrays that can be used to implement stacks and vectors. The number of elements such arrays contain can grow or shrink as required by the program, and bounds checking is performed on every array operation that needs it. CLU also has GC facilities, which takes into account the dynamic nature of the arrays. The CLU language is described, for example, by Liskov, in "A History of CLU," published in *HOPL Preprints* (1993), which is incorporated herein by reference. Most languages, among them Java, do not offer this capability.

SUMMARY OF THE INVENTION

It is an object of some aspects of the present invention to provide methods and programs for analyzing liveness of array elements.

It is a further object of some aspects of the present invention to provide improved methods and programs for garbage collection, and particularly for run-time garbage collection in Java.

In preferred embodiments of the present invention, a software processing tool analyzes software program code so as to detect dead array elements used in the code. Typically, the array elements comprise object references contained in an array of such references. The dead object references (or other elements) are detected based on a liveness analysis of the elements in the array performed at selected points in the program, combined with an analysis of relationships among program variables and the array elements to find mutual constraints among the object references at those points. Most preferably, the constraints are in the form of relations governing one or more program variables used to index the object references in the array and indicate a range of values of the variables that may occur at a given point in the program. The program variable relations and liveness analysis are used together to determine, at each of the selected points in the program, one or more ranges of array elements, typically denoted by corresponding ranges of indices of the object references in the array, that must be dead at that point.

Information regarding the liveness or deadness of the various ranges of array elements is used to improve the efficacy of memory management used in running the software program code. Preferably, the dead ranges are reported to a garbage collection function, which accordingly traces only those elements that may be alive at any given point. Thus, when a range of object references in the array is found to be dead, the corresponding objects are possibly removed from the garbage collector's inventory of objects reachable from the array. Thus, if the objects are not reachable via some other path of pointer traversals, then the memory assigned to them can be reclaimed.

Thus, unlike programming techniques and tools known in the art, preferred embodiments of the present invention enable array memory leaks to be detected and prevented automatically. Although dynamic arrays, such as those used in the CLU language, offer a partial solution to prevention of memory leaks, they cannot be used for cyclic queues and still be advantageous in this respect. In any event, dynamic arrays are not a standard part of Java or other common programming languages. The method suggested by Agesen et al. for analyzing liveness of references in local variables, as noted in the Background of the Invention, cannot usefully be applied to arrays, since an array represents a set of references, wherein every array element is a potential reference, while a reference variable represents only one potential reference.

In some preferred embodiments of the present invention, the software processing tool comprises a compiler or is used together with a compiler for code optimization purposes, particularly for preventing memory leaks. Most preferably, the compiler is a Java language compiler, operating either on Java source code or on Java byte code as a Just-In-Time (JIT) compiler (or other run-time compiler). Alternatively, the tool may be integrated as an embedded component in other programming environments, preferably as part of a garbage collection library for use with a language, such as C or C++, that does not normally offer garbage collection. Alternatively or additionally, the tool is used in software testing, to verify that software code is free of memory leaks.

In preferred embodiments of the present invention, the software processing tool is used to analyze and optimize code at the Java class level. The tool can similarly deal with "private" arrays within any encapsulated portion of a program. Although the principles of the present invention can be applied to analyze and optimize large programs, as well, the analysis is best performed on smaller, self-contained portions, such as classes, in order to reduce the time required to analyze the code. Furthermore, due to the capability of Java to load classes in run-time, not all of the code is necessarily available even when a program starts running. Proper use of encapsulation in coding a larger program, as is known in the art, ensures that the tool will have an opportunity to discover most or all of the leaks in the larger program. When a class is extended, in accordance with normal Java practice, optimization as described herein is applied only so long as the conditions that made possible the optimization of the original class still hold, i.e., as long as the liveness analysis continues to identify the same ranges of array elements as being alive or dead as in the original class.

There is therefore provided, in accordance with a preferred embodiment of the present invention, a method for memory management in execution of a program by a computer having a memory, including:

identifying in the program an array of array elements;

determining at a given point in the program a range of the elements within the array such that none of the elements in the array outside the range is alive at the point; and passing information regarding the determined range to a memory management function, so that memory locations are associated with the array elements responsive to the determined range.

Preferably, identifying the array includes identifying an array of elements which is indexed by a program variable, and determining the range of the elements includes finding a relation with respect to values of the program variable. Most preferably, finding the relation includes finding an inequality relationship governing possible values of the program variable at the given point in the program, wherein finding the inequality relationship includes defining a constraint graph that determines a bound on permitted values of the program variable.

Preferably, finding the relation includes performing an analysis of relations of the program variable in the program in a forward direction relative to an execution sequence of the program, thus determining one or more relationships between the program variable and a constant and/or another program variable. Further preferably, determining the range of the elements includes performing a liveness analysis of the program in a backward direction relative to an execution sequence of the program. Most preferably, performing the liveness analysis includes determining at the given point in the program that a first element in the array, indexed by a first value of the program variable, is not alive at the given point, and performing the analysis of program variable relations includes finding a relation at the given point in the program, such that if the first element is not alive at the given point, then at least one second element in the array, indexed by a second value of the program variable related by the program variable relations to the first value, is also determined not to be alive at the given point. Preferably, passing the information includes informing the memory management function that both the first and the second elements are not alive.

Preferably, performing the analysis of program variable relations includes defining a constraint graph that determines a bound on permitted values of the program variable at the given point in the program, and performing the liveness analysis includes adding a constraint to the constraint graph with respect to liveness of the elements to which the program variables correspond.

Preferably, finding the range of the elements includes performing a flow analysis of the program so as to identify one or more live ranges of the array, wherein an element within the one or more ranges is alive at the given point in the program if there is an execution sequence using the element in the program following the given point, and there is no assignment of the memory location assigned to the element intermediate the given point and the use of the element by the execution sequence. Most preferably, identifying the one or more live ranges includes performing a data flow analysis of the program in a backward direction relative to the execution sequence.

In a preferred embodiment, the array elements include references to objects used in the program, and the program includes a program module, which is called by another program module, wherein the references are indexed by program variables that are substantially encapsulated within the module.

Preferably, passing the information includes identifying elements in the array that are outside the range so that memory locations assigned thereto can be reclaimed by a garbage collection function.

In a preferred embodiment, identifying the elements outside the range includes providing an explicit assignment of one or more of the elements to null responsive to the identification, so that the memory locations assigned to the one or more elements can be reclaimed during run time of the program.

In another preferred embodiment, identifying the memory locations includes providing to the garbage collection function an identification of the range of the elements, so that the garbage collection function will not trace the elements outside the range. Preferably, the program includes a program module, which is called by another program module, and passing the information includes storing information identifying the range of the elements in a data field associated with the module. Most preferably, the program module includes a Java class, and passing the information includes setting a flag in a class data structure associated with the class to indicate that the information is available.

Preferably, determining the range of the elements includes analyzing the program module to find a range of live elements in the array while compiling the program module, wherein the program module includes a Java program module, and wherein analyzing the program is performed by a Java compiler. Preferably, the Java compiler receives and compiles Java source code or, alternatively or additionally, Java byte code.

There is further provided, in accordance with a preferred embodiment of the present invention, a method for program execution, including:

receiving code corresponding to a program module, which includes a data field containing information that identifies a range within an array of elements used in the program module such that at a specified point in execution of the program module, none of the elements in the array outside the range is alive;

running the code so as to assign memory locations to the elements in the array; and reclaiming during run time of the code the memory locations assigned to at least some of the elements in the array that are outside the range, whereby the reclaimed locations may be assigned to other elements and a memory leak is prevented in the execution of the program.

Preferably, receiving the code includes receiving code in which a range of values of a program variable that indexes the elements in the array is identified.

Further preferably, reclaiming the memory locations includes actuating a garbage collection function.

There is also provided, in accordance with a preferred embodiment of the present invention, a method for software verification, including:

creating an array of vectors, each vector comprising an array of vector elements;

adding a new vector to the array;

adding a new vector element to the new vector, such that a memory location is assigned to the element;

removing the element without explicitly assigning the element to null;

repeating the steps of adding a new vector, adding a new vector element to the new vector, and removing the element a given number of times, whereby a memory error that occurs due to repeating the steps is detected.

There is additionally provided, in accordance with a preferred embodiment of the present invention, programming apparatus, including:

a memory, which stores program code including an array of elements; and a processor, coupled to read from and write to the memory, which finds at a given point in the program a range of the elements within the array such that none of the elements in the array outside the range is alive at the point, responsive to which range the processor manages the assignment of memory locations to the elements in the array during execution of the program code.

Preferably, the program includes a Java program, and the processor analyzes the program to find the range of elements while compiling the program.

There is moreover provided, in accordance with a preferred embodiment of the present invention, apparatus for program execution, including:

a memory, which stores code corresponding to a program module, which includes a data field containing information that identifies a range within an array of elements used in the program module, such that at a specified point in execution of the program module, none of the elements in the array outside the range is alive; and a processor, which runs the code while assigning locations in the memory to the elements in the array, such that during run time, the memory locations assigned to at least some of the elements in the array that are outside the range are reclaimed, whereby the reclaimed locations may be assigned to other elements so that a memory leak is prevented in the execution of the program.

There is furthermore provided, in accordance with a preferred embodiment of the present invention, apparatus for software verification, including:

a memory, having a given size; and a processor, coupled to read from and write to the memory, which creates an array of vectors, each vector comprising vector elements, and successively adds new vectors to the array and adds and then removes new elements to the new vectors a given number of times without explicitly assigning the removed elements to null, thereby to determine whether a memory error occurs due to an array memory leak.

There is also provided, in accordance with a preferred embodiment of the present invention, a computer software product for detection of memory leaks in computer code defining a computer program, the product including a computer-readable medium in which are embedded computer-readable instructions in an executable file, which when read by a computer, cause the computer to identify in the program an array of elements and to find at a given point in the program a range of the elements within the array such that none of the elements in the array outside the range is alive at the point, and to pass information regarding the determined range to a memory management function, so that memory locations are associated with the array elements responsive to the determined range.

Preferably, the memory locations assigned to at least some of the array elements outside the range are reclaimed by a garbage collection function.

In a preferred embodiment, the computer-readable instructions are associated with a compiler, which compiles the computer code. Preferably, the computer code includes Java source code or alternatively or additionally, Java byte code optionally, the computer-readable instructions belong to an embedded memory usage reduction component in a compilation library. Preferably, responsive to the information regarding the determined range, the compiler optimizes execution of the program, which may include a Java class. Most preferably, the instructions cause the computer to provide an output indicative of possible memory leaks in the program.

In a further preferred embodiment, the instructions cause the computer to insert null assignments in the computer code so as to prevent memory leaks.

There is additionally provided, in accordance with a preferred embodiment of the present invention, a computer software product for use in execution of computer code defining a program module, which module includes a data field containing information that identifies a range within an array of elements used in the program module such that at a specified point in the execution of the program module, none of the elements in the array outside the range is alive, the product including a computer-readable medium in which are embedded computer-readable instructions in an executable file, which when read by a computer, cause the computer to reclaim during the execution of the code the memory locations assigned to at least some of the elements in the array that are outside the range, whereby the reclaimed locations may be assigned to other elements and a memory leak is prevented in the execution of the program.

Preferably, the memory locations of the at least some of the elements outside the range are reclaimed by a garbage collection function.

In a preferred embodiment, the product includes a Java run time facility, and the program module includes a Java class. Preferably, the product includes an embedded component in a Java Virtual Machine.

There is moreover provided, in accordance with a preferred embodiment of the present invention, a computer software product, including a Java language class embedded in a computer-readable medium, the class containing computer-readable data, including a data structure in which information specific to the class is stored, the data in the structure including a data field containing information that identifies a range within an array of elements used in the class, such that at a specified point in execution of the class, none of the elements in the array outside the range is alive, and such that when a computer on which a Java Virtual Machine is running reads the data in the class, the information in the data field causes the computer to reclaim memory locations assigned to at least some of the elements in the array that are outside the range, whereby the reclaimed locations may be assigned to other elements and a memory leak is prevented in execution of the program.

The present invention will be more fully understood from the following detailed description of the preferred embodiments thereof, taken together with the drawings in which:

BRIEF DESCRIPTION OF THE DRAWINGS

FIGS. 5–9 are graphs that schematically illustrate constraints determined with respect to variables used in the program of FIG. 4, in accordance with a preferred embodiment of the present invention.

DETAILED DESCRIPTION OF PREFERRED EMBODIMENTS

Figure 1:
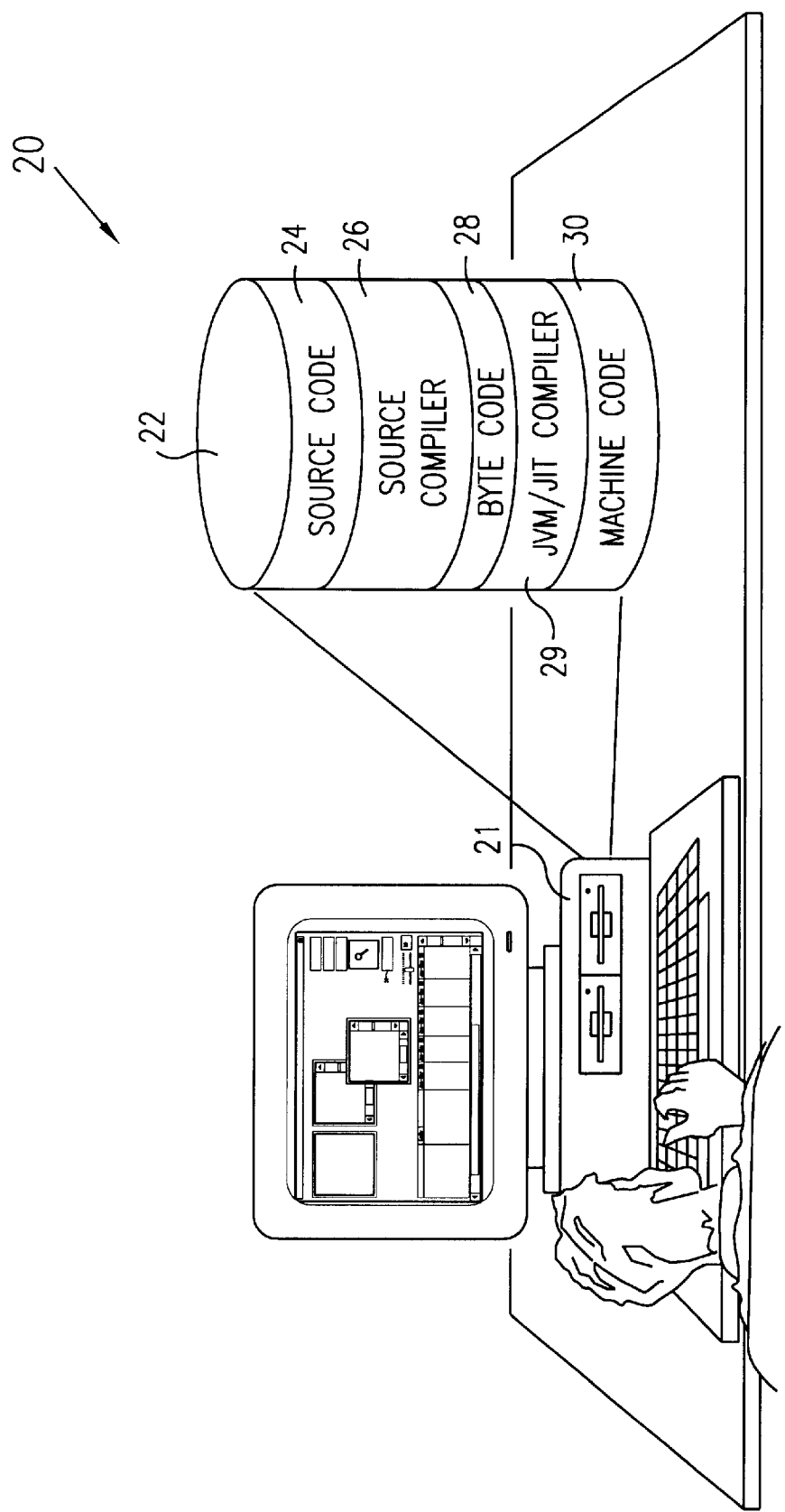
FIG. 1 is a schematic representation of a computer system for program code analysis and optimization, in accordance with a preferred embodiment of the present invention.

Reference is now made to FIG. 1, which is a schematic, partly pictorial representation of a computer system 20 for program code analysis and optimization, in accordance with a preferred embodiment of the present invention. The system comprises a processor 21 and a memory 22, which typically includes both RAM and disk memory, in which software source code 24 is stored. For the purposes of the description that follows, the code preferably comprises Java language code, although the principles described hereinbelow may similarly be applied to code written in other programming languages.

After source code 24 is written, it is compiled by a suitable source compiler program 26 to yield Java byte code 28. The byte code stored in or available to memory 22 typically includes, as well, Java classes that were compiled and stored previously. In order to run the byte code, system 20 invokes a Java Virtual Machine (JVM), as is known in the art. Optionally, the JVM uses a Just-In-Time (JIT) compiler 29 to generate machine code 30 for frequently-executed methods and methods with loops to be run by processor 21. Either source code 24 or byte code 28 or both are analyzed, as described in detail hereinbelow, to identify "live" and "dead" object references, including references to objects in arrays. Such identification is preferably performed by source compiler 26 and/or JIT compiler 29 or, alternatively, by a program analysis service run by the JVM. Further alternatively or additionally, such program analysis is run in advance, and results of the analysis are supplied to system 20 along with the source code and/or byte code for at least a portion of the classes in the code. The identification of the live and dead array references is used by run-time garbage collection (GC) facilities of the JVM, so that the memory assigned to the objects associated with the dead references can be reclaimed and reassigned. In this manner, when the code is run, array memory leaks are avoided.

Compilers 26 and 29 are supplied to system 20 in the form of software packages. The specific software code for dead object detection is preferably supplied as a part of one or both of the packages, but may alternatively be supplied separately as an add-on or plug-in to an existing compiler. The software packages and code may be supplied on tangible media, such as diskettes or CD-ROM, and loaded into the system. Alternatively, the software may be downloaded to the system via a network connection or other electronic link.

Figure 2:
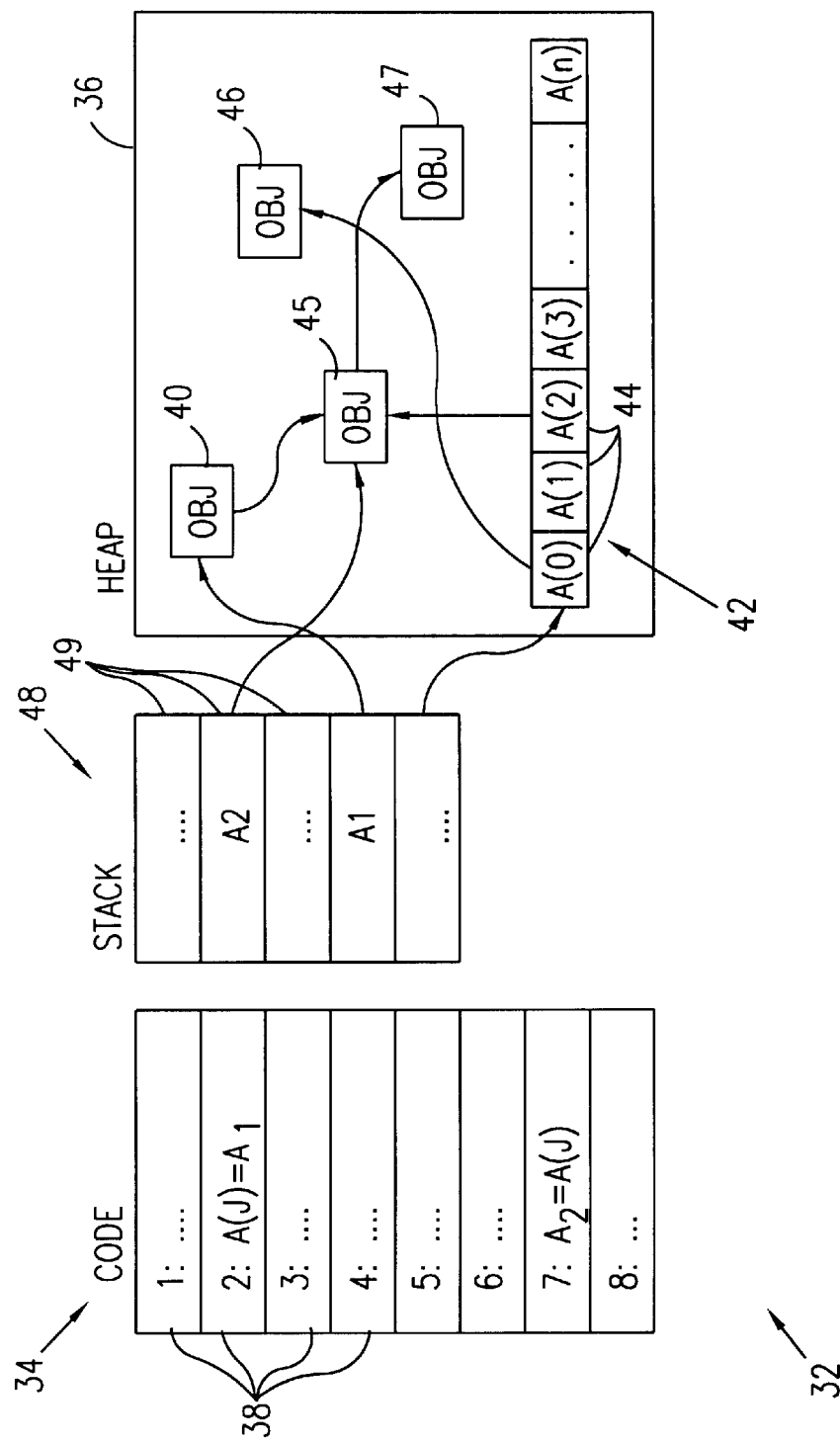
FIG. 2 is a block diagram that schematically illustrates the structure of a computer program analyzed by the system of FIG. 1, in accordance with a preferred embodiment of the present invention.

FIG. 2 is a block diagram that schematically illustrates the structure of a program 32 compiled and analyzed by system 20, in accordance with a preferred embodiment of the present invention. As is known in the Java art (as well as in other programming languages), program 32 comprises at least one thread 34 of program steps, or instructions, 38 and an associated stack 48 of frames 49 containing parameters and local variables. (A program may have several such threads running concurrently, but for the sake of simplicity, only one thread is shown here.) The variables in the stack include pointers to a "heap" 36 of program objects 40, 45, 46, 47. The objects shown in heap 36 also include an array 42 containing an indexed sequence of array object references 44, labeled A(0), A(1), . . . , A(n). The length of the array (n+1) is declared at an appropriate stage in the program.

Objects in heap 36 are used when referred to by a pointer from one of frames 49 in stack 48, or by a pointer from another object 40, as illustrated in FIG. 2. An object is reachable if it is referenced directly from stack 48, from a global variable or from another reachable location. In garbage collection as is known in the art, an object that is not reachable after a given step in the execution flow of program 32 is identified as garbage, and memory assigned to the object is reclaimed. Array A is reachable from the stack frame, so that a conventional Java garbage collector at this stage of program 32 would view the objects referenced by elements of array 42 as reachable, even if some of array object references 44 were no longer in use or were never used. Thus, object 46, which is referred to by a pointer from array element A(0), would not be collected.

On the other hand, program analysis in accordance with the principles of the present invention analyzes the use of array 42 in program 32 so as to find live ranges of array 42 with respect to program variables. Accordingly, the analysis may determine, for example, that after program step 7, only those elements of array 42 whose index is greater than or equal to J are alive. During run time, it may happen that after program step 7, J is equal to 2, and garbage collection is performed after program step 7. Consequently, dead elements A(0) and A(1) are not scanned in garbage collection, and object 46 is considered to be garbage whose memory allocation may be reclaimed, since it is not reachable from a root. On the other hand, even if A(2) were found to be dead, objects 45 and 47 might not be considered garbage, since they are also reachable from one of frames 49 in stack 48.

Figure 3:
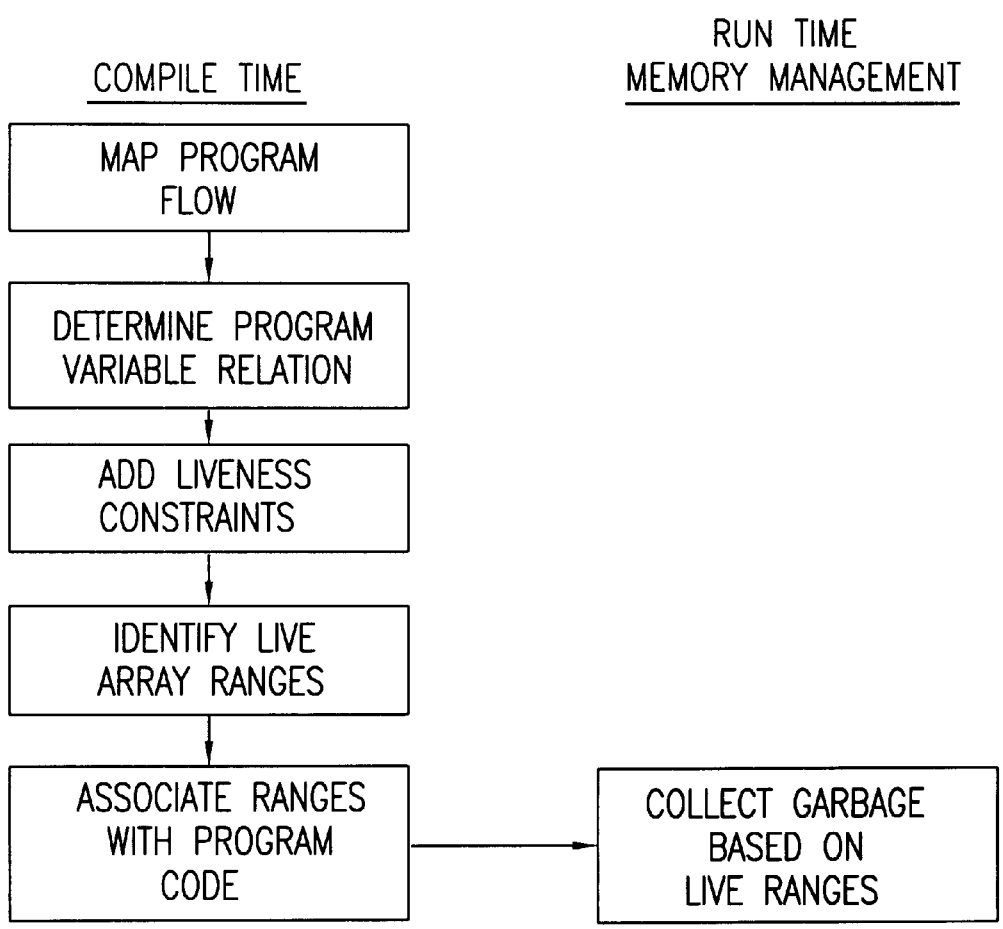
FIG. 3 is a flow chart that schematically illustrates a method for analysis and garbage collection of array memory leaks, in accordance with a preferred embodiment of the present invention.

FIG. 3 is a flow chart that schematically illustrates a method for liveness analysis and garbage collection (GC) with respect to arrays, such as array 42, occurring in a program, in accordance with a preferred embodiment of the present invention. The method is particularly useful in detecting and removing array memory leaks. The method is summarized briefly in the following paragraphs, following which details of each of the steps of the method are described at length hereinbelow.

To facilitate the analysis, the program flow is mapped, including all possible program flow paths. A suitable method for such mapping is illustrated and described hereinbelow with reference to FIG. 4. Analysis of program variable relations is applied to the program in order to determine constraints on the program variables. In particular, constraints are determined with regard to relations governing the indices of arrays used in the program at each relevant point in the program flow. The variable relations analysis is applied in a forward direction with respect to the actual program flow and is preferably used to find constraint graphs relating the program variables, as shown in FIG. 5.

Liveness analysis is also applied to the program to find additional constraints on the variables, and particularly on the array indices, so as to determine at the relevant points in the program flow which ranges of the array are alive, and which are dead. The liveness analysis is performed in a backward direction relative to the program flow. Preferably, the results of the variable relations analysis is combined with the liveness constraints during the liveness analysis in constraint graphs of the form shown in FIGS. 6–9. The combined liveness information and program variable relations at each of the relevant points are used to identify array elements, and in particular to identify ranges of elements within arrays, that are known to be dead at the point. This identification of live and/or dead ranges is maintained with the program and is passed to the garbage collector at run time. The garbage collector applies the information by not tracing the dead ranges of the arrays, so that memory associated with the dead ranges can be reclaimed, for example, memory associated with objects referenced by array elements in the dead range, which are reachable only via array elements in the dead range.

Figure 4:
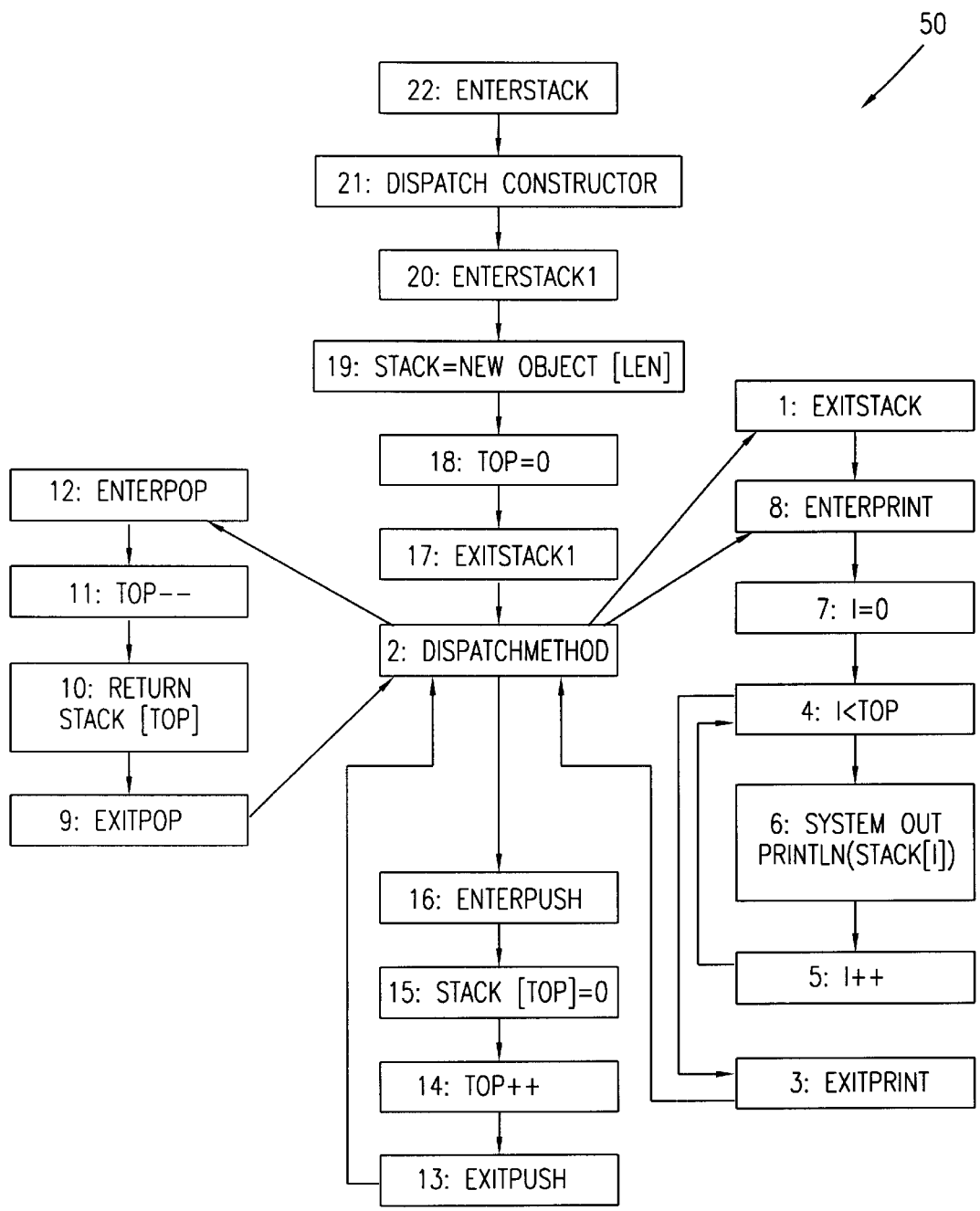
FIG. 4 is a graph that schematically illustrates program flow in a sample program analyzed by the system of FIG. 1, in accordance with a preferred embodiment of the present invention.
Figure 5:
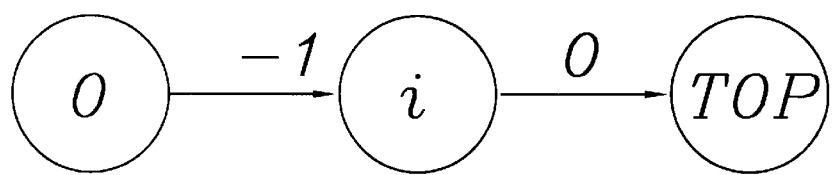

FIG. 4 is a graph, of a type known as an approximated supergraph 50, used to analyze program flow in accordance with a preferred embodiment of the present invention. The theory and use of supergraphs in program analysis is described by Reps et al., in "Precise Interprocedural Dataflow Analysis via Graph Reachability," in *Principles of Programming Languages* (ACM Press, 1995), p. 49, which is incorporated herein by reference. Supergraph 50 schematically illustrates the program flow in the simple example program shown hereinabove in Table I. The present embodiment thus illustrates application of the present invention to Java source code at the class level. The principles embodied in the description that follows, however, are equally applicable to analysis of byte code, by JIT compiler 29, for example, and may also be applied to program modules other than classes, or to entire programs. Furthermore, although preferred embodiments of the present invention are described hereinbelow with reference to certain types of graphs, it will be understood that these graphs are presented here for convenience in analysis and explanation, and the principles of the present invention may similarly be applied using other suitable methods of program analysis, as are known in the art.

Supergraph 50 integrates a program call graph of the overall example program and individual control flow graphs of each of the procedures in the program. The supergraph of a given class C is an approximation of supergraphs occurring at any instance of C in the following sense:

A local variable is encapsulated in C if it is not passed as a parameter or allowed to "escape" from C through aliasing. The same definition holds for instance variables, except that they must also be declared private. Conservative assumptions must be made for variables that are not encapsulated in order to avoid a live variable being tagged as dead. Since the scope of local variables is lost in such an analysis, unique names are preferably assigned to different variables having the same name. For frequently-used methods whose effect is known, such as System.out.println and java.lang.system. arraycopy, it is possible to make exceptions to this encapsulation rule.

In the example shown in FIG. 4, the expressions "stack" and "top" are private and not passed as parameters, and i is a uniquely-named local variable. None of these variables escape or are passed as parameters. Therefore, they are all encapsulated in Stack.

The EnterStack node (or more generally, an "EnterClass" node) corresponds to program points where an instance C is allocated. Essentially, it is similar to the entry of a program.

Following EnterStack there is a special supergraph node 21: DispatchConstructor, corresponding to program points where a constructor is invoked, as is known in the Java art. There are typically arcs in the supergraph from this node to any constructor in C. Thus, in approximated supergraph 50, there is no information regarding the constructor that was applied. Furthermore, it is assumed that the values of actual parameters used in such constructors are not known.

In the example shown in FIG. 3, there is one constructor with statements shown at the supergraph nodes 19 and 18. The value of "len" is assumed to be unknown, so that in the analysis hereinbelow, no assumption can be made regarding the size of the array "stack."

After applying the constructor, an arbitrary number of invocations of methods belonging to the class are allowed, using node 2: DispatchMethod. The values of the parameters used in the methods are assumed to be unknown. A finalize method is treated similarly, except that it can only be executed once. In the example shown in FIG. 3, supergraph nodes 6, 7, 5, and 4 include the statements for the "print" method; supergraph nodes 15 and 14 include the statements for "push"; and supergraph nodes 11 and 10 include the statements for "pop." At node 15, the value of the parameter o, pushed into the stack, is not known.

In the simplified analysis of the present embodiment, invocations of subclass methods are ignored, since they cannot affect encapsulated information. Since the purpose of this analysis is to find safety properties, i.e., properties that hold (or do not hold) in every supergraph node, execution paths that do not use the encapsulated data are immaterial.

The ExitStack supergraph node (or more generally, an "ExitClass" node) represents the program points where an instance of C is not subsequently used in the program.

When a class method invokes another method (possibly itself), arcs are preferably added connecting the call node to the DispatchMethod node and between the DispatchMethod node and successor nodes of the call node, in order to ensure that the analysis is conservative. These arcs approximate a possible callee, which in turn invokes a method belonging to the class. Alternatively, a finer-grained approach may be taken, in which non-virtual invocation is considered, for example. Thus, for invocation of a private method M' belonging to the class, an arc is added from the call node to beginM' node, and arcs are added from endM' to the successor nodes of the call node.

Those skilled in the art will be able to extend the framework described hereinabove in a straightforward manner to deal with class variables, static methods and static initializers. Other Java constructs can also be handled. For example, try-catch-finally can be dealt with by converting try-catch to an "if" statement. Synchronization is preferably handled due to the fact that all the instance methods of the class are synchronized. Finer-grained approaches are also possible, for example, when class instances are thread-local, i.e., not shared among program threads, then the instance methods of the class may be non-synchronized.

More advanced analysis that relaxes some of the constraints on encapsulation, for example, to allow protected instance variables, can be achieved by analyzing subclasses, as well. Alternatively, or additionally, a relaxed compilation model may be used for this purpose, as described by Budimlic et al., in an article entitled "Optimizing Java: Theory and Practice," in *Concurrency: Practice and Experience* 9 (June, 1997), which is incorporated herein by reference.

Supergraph 50 in FIG. 4, corresponding to the tabular form of the sample class shown in Table I, is used to determine the liveness of arrays in the class Stack. In this case, the liveness of the array "stack" is analyzed. For this purpose, the definition of liveness, given in the Background of the Invention with respect to scalar variables, is extended to include memory location expressions, as well, such as the expression stack[i] used in Stack. The extended definition allows a given expression to denote more than one memory location (or reference) for different execution paths in the program. Thus, for example, stack[top] is live before step s in the class shown in Table I, but not before any other point in the class. It is not live before the end of the method "pop," since on any sequence from that point to a use of a location denoted by stack[top], this location must be assigned a new value at step s'. On the other hand, stack[i] is live before step s" for all $0 \leq i < top$. This is the kind of the information that is used subsequently in garbage collection.

FIG. 5 is a constraint graph 60, which represents inequalities governing the program variables i and top, in accordance with a preferred embodiment of the present invention. Constraint graphs are described in detail by Cormen et al., in Chapter 25.5 of Algorithms (MIT Press and McGraw Hill, 1994), which is incorporated herein by reference. The constraint graph is a finite labeled directed graph G=(V, E, w), with a vertex in v ∈ V for every encapsulated integer variable or field, along with a special 0 vertex. Every directed edge e in E is labeled by an integer weight w(e). The 0 vertex is used to express constraints between a program variable and a constant. For example, the constraint $x \leq c$ is represented by a "c" edge from vertex 0 to vertex x.

The constraint graph is a practical implementation of a set of constraints, wherein operations on the set are equivalent to solving path-finding problems on the directed graph. Such a directed graph generally represents the inequalities:

$$\bigcap_{\langle x,y \rangle \in E} x \leq y + w(\langle x, y \rangle)$$

Here "x" and "y" are the vertices in the graph, and w(x,y) is the weight of the edge connecting "x" to "y."

Constraint graph 60 shown in FIG. 5 represents the inequalities following node 5: i++ of supergraph 50. The −1 edge from 0 to i represents the inequality $0 \leq i+(-1)$, or $0 < i$, while the 0 edge from i to top represents $i < top$. Thus, every directed path in the constraint graph corresponds to an implied constraint between the source and the target of the path, with a weight that is the sum of the weights of the edges on that path. The shortest path between any two vertices corresponds to the strongest implied constraint between the source and target variables. The constraint graph represents a contradiction if there exists a negative directed cycle in the graph, corresponding to an infeasible program state. In this case a special constraint graph is used, denoted "bottom."

In order to determine the liveness of the elements of the array stack[i] in supergraph 50, constraint graphs such as graph 60 are constructed at every relevant node of the supergraph. The construction proceeds iteratively, in a forward direction with respect to the flow of the program represented by the supergraph. The constraint graphs should be conservative, in the sense that any inequality represented by the constraint graph at any given node must hold for every execution of the program passing through the point represented by that node. Detailed construction of all of the necessary graphs will be clear to those skilled in the art.

Once the computation of the constraint graphs representing inequalities among the variables is completed, by forward iteration through supergraph 50, the live regions in the arrays used in the program are found by backward iteration through the supergraph, as noted above with reference to FIG. 3. The live regions can also be represented using constraint graphs, with one additional node, denoted by $ in the description that follows, which represents the indices corresponding to the live regions.

Figure 6:
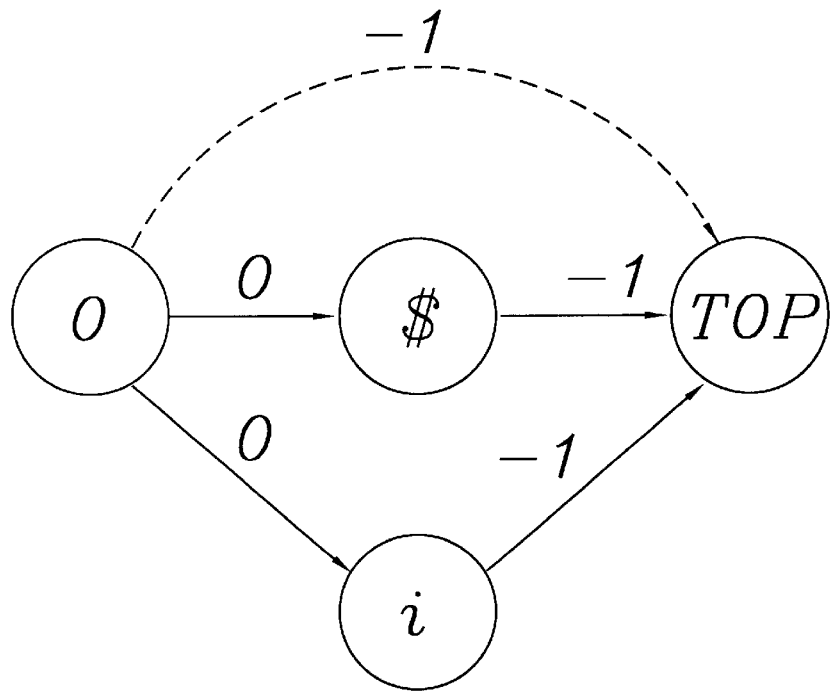

FIG. 6 is a constraint graph 70 representing liveness information before node 4 of supergraph 50, in accordance with a preferred embodiment of the present invention. It corresponds to the inequalities $0 \leq \$ < top$ and $0 \leq i < top$ and represents the fact that array elements stack[0], stack[1], . . . , stack[top−1] are live. In addition, the live region is conditional because of the −1 edge connecting vertex i to vertex top, i.e., the stack elements may be referenced only if the print loop is entered, so that i must be less than top. In other words, if $i \geq top$, then none of the array elements is alive. It is noted that the inequality i<top may be violated on some paths leading to supergraph node 4.

In general a constraint graph G represents the following liveness information:

$$\left\{ A[\$] \middle| \bigcap_{\langle x,y \rangle \in E} x \leq y + w(\langle x, y \rangle) \right\}$$

wherein A is an encapsulated array; A[$] denotes the live array elements; and live regions come into play when either x or y is $.

Constraint graph 70 in FIG. 6 represents the following liveness information:

$$\{stack[\$] | 0 \leq \$ + 0 \hat{~} \$ \leq top+(-1) \hat{~} 0 \leq i+0 \hat{~} i \leq top+(-1)\}$$

The method for finding graph 70 described hereinabove is conservative, i.e., the identified live regions must include "actual" live regions. A special constraint graph, denoted by dead(stack), or in general dead(A) for an array A, is also allowed.

When the backward iteration has terminated, for every supergraph node n and for every program point p that corresponds to n, if stack[i] is live before p, i must satisfy all the constraints in the constraint graph that were found at n. (In other words, if i does not satisfy all the constraints, then stack[i] is known to be dead.) Details of the iteration process will be clear to those skilled in the art.

In performing the iteration, nodes of supergraph 50 are visited in post depth first order, as described by *Muchnick in*

*Advanced Compiler Design and Implementation* (Morgan Kaufmann, 1997), which is incorporated herein by reference, while a constraint graph is maintained for each of the nodes. It is initially assumed that all information is available, and that the array is dead. Then liveness information is backward-propagated along supergraph paths. When several paths from a supergraph node exist, it is conservatively assumed that liveness information includes the liveness information along all outgoing paths (except for certain program conditions that are partially interpreted, thus eliminating some infeasible paths).

In the backward iteration, too, the method described herein may be overly conservative, i.e., at a program point p, it may assume some array elements to be live even though there is no execution path from p to a use of these array elements prior to redefinition. In particular, there are four possible types of inaccuracies:

It is not taken into account that Java requires that array references be safe. For example, i must be non-negative after a use of a[i].

A single supergraph node is used to represent many program points by adding extra supergraph arcs, which can lead to infeasible paths.

The supergraph may contain "invalid" interprocedural paths that do not respect the call-return mechanism. Possible solutions to this deficiency are offered, for example, in Chapter 2.5 of the above-mentioned book by Nielson et al., which is incorporated herein by reference.

Despite these inaccuracies, precise results were obtained in analysis of the Stack class using the present simplified method. Details of this method are described hereinbelow.

The liveness analysis of supergraph 50 starts with supergraph node 1: ExitStack. Here it is known that none of the array elements are live. Supergraph nodes are then visited in succession until no more changes occur in the liveness constraints. When a supergraph node changes, its predecessors are visited. When a node is processed before all of its successors are known, the constraint graphs at the unknown successors are ignored.

After the effect of a supergraph node is taken into account, the strongest implied constraints, as defined hereinabove, are taken into account. In FIG. 6, the dotted edge between vertex 0 and vertex top in graph 70 corresponds to the strongest implied constraint between 0 and top. It is possible to add the strongest implied constraints as the supergraph nodes are being processed.

In iterating through the supergraph, nodes that do not affect liveness information are skipped, and the constraint graph after the node is simply copied to the constraint graph before the node. These skipped nodes include:

Nodes for statements that do not assign to encapsulated variables and do not use or assign the elements of the array of interest.

Special supergraph nodes, such as EnterStack and DispatchMethod.

When the supergraph flow splits, a "join" operation is used. "Join" is the intersection of the (strongest implied) constraints occurring on all splitting supergraph paths. It guarantees that the obtained liveness information is conservative. For a pair of vertices x,y, the new constraint selected at a split in the supergraph is the weakest constraint of the strongest implied constraints between x and y in the constraint graphs being joined (i.e., the longest of the shortest respective paths from x to y in the constraint graphs being joined).

FIG. 7 shows constraint graphs 80 and 82 found in analysis of the sample program at node 8 (EnterPrint) and node 12 (EnterPop) of supergraph 50, respectively, in accordance with a preferred embodiment of the present invention. The liveness information reflected by graph 80 corresponds to the expression:

$$\{stack\ [\$]|0 \leq \$ \leq top\}$$

whereas graph 82 corresponds to:

$$\{stack\ [\$]|\$ < top\}$$

When the two constraint graphs are joined to obtain the liveness information occurring after node 2 (DispatchMethod) in supergraph 50, the resultant graph is identical to graph 82. The edge connecting vertex 0 to vertex $ in graph 80 is not included in the resultant graph, since it is a constraint that appears only in graph 82.

The liveness of stack[i] (or of any other array expression) before a given supergraph node n depends on two things:

The value of i on supergraph paths from node EnterStack leading to node n, which determines the location denoted by stack[i] at node n.

The use of that location on supergraph paths emanating from node n.

Therefore, integrating the forward information regarding the value of i and the backward information regarding the liveness of stack[i] has a dramatic impact on the precision of the analysis in finding memory leaks.

Despite the different nature of the forward and backward information, they can be integrated simply since both are represented by constraint graphs. If the forward information is denoted by $G_f$, and the backward information by $G_b$, their integration, integrate($G_f,G_b$), is defined according to the following two rules:

If $G_b$=dead(A), then the forward information is irrelevant, since it does not provide any constraints on the use of the array, and integrate($G_f$,dead(A)) yields dead(A). Here dead(A) is a special constraint graph representing the situation wherein for array A, none of the array elements is alive.

Otherwise, for every pair of vertices x,y, integrate($G_f,G_b$) includes the strongest constraint of the strongest implied constraints between x and y in $G_b$ and $G_f$.

FIG. 8 shows constraint graphs 90 and 92, and their integrated result graph 94, in accordance with a preferred embodiment of the present invention. Graph 90 represents constraints contained in the forward information found before node 6: System.out.println(stack[i]) of supergraph 50. Graph 92 represents backward information regarding the liveness of array element stack[i]. When a statement, such as that at node 6, uses stack[i], the live region is enlarged to include the current (forward) value of i. This means that the constraints on $ are relaxed, such that $=i is satisfiable. Integrating the forward information and the fact that stack[i] is live gives result graph 94 on the first visit to node 6.

Graph 94 is then joined with the constraint graph following node 6 to obtain the constraint graph before the node. In this case, the liveness information after node 6 is dead (stack), so that graph 94 is unaffected.

On the other hand, for a statement assigning a value to stack[i], the live region is typically shrunk to exclude the current (forward) value of i. This means that the constraints on $ can be made stronger to exclude the liveness of stack[i]. Constraint graphs, however, cannot explicitly represent negations of equalities, and therefore it is not always possible to exclude the liveness of stack[i]. Only constraints of the form $\$<i$ or $i\leq\$$ can be strengthened to $\$\leq i+(-1)$ or $i\leq\$+(-1)$, respectively. In the constraint graph, this corresponds to decrementing the 0 edge from vertex 0 to vertex i by 1 and decrementing the 0 edge from vertex i to vertex 0 by 1.

Figure 9:
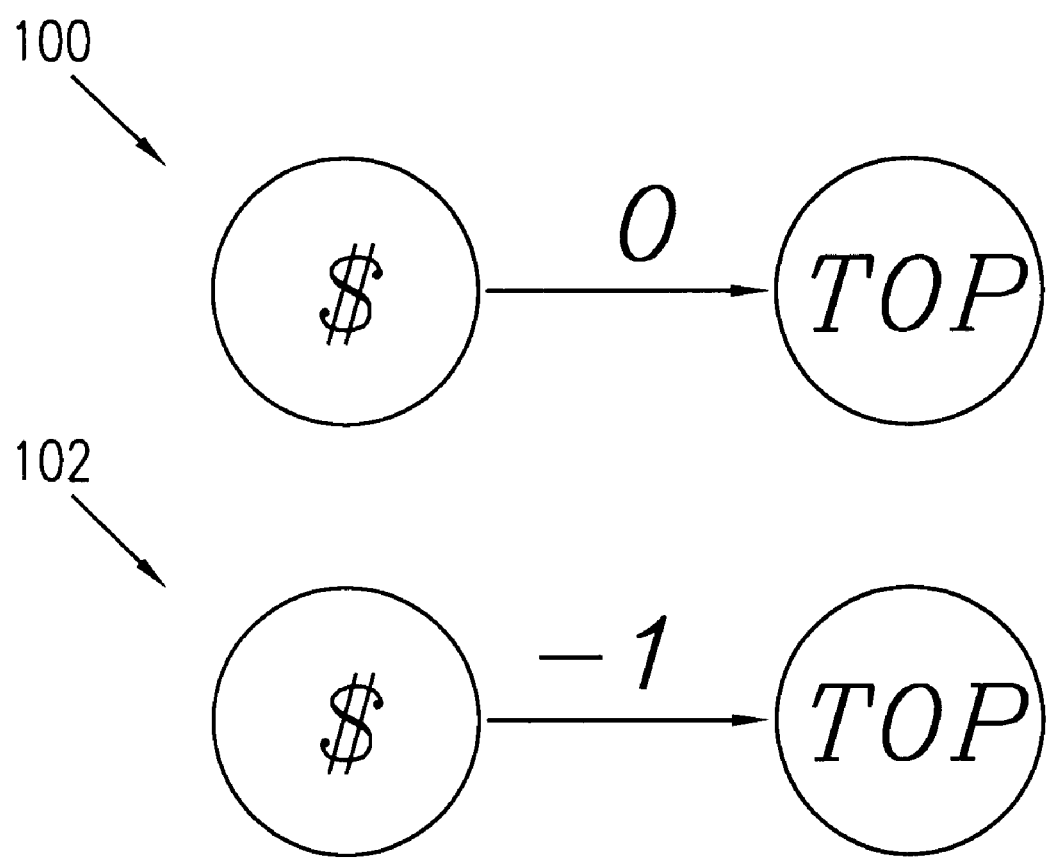

FIG. 9 shows constraint graphs 100 and 102, corresponding to a point in supergraph 50 before node 15: stack[top]=o, in accordance with a preferred embodiment of the present invention. Graph 100 corresponds to liveness information given by the expression:

$$\{stack[\$]|\$\leq top\}$$

Graph 102 is obtained by shrinking the live region $\$\leq top$ to $\$\leq top+(-1)$.

A simpler case is the assignment to the whole array, for example, at node 19: stack=new Object[len]. In this case, the resulting constraint graph is simply dead(stack).

For the assignment statements i=j+c or i=c, the liveness information is obtained by substituting occurrences of i with j+c or with c, respectively. If i occurs in the left side of a constraint, then the constraint is normalized. For example, for the constraint i<j'+c', after substituting j+c for i, the normal form becomes $j\leq j'+(c'-c)$.

In the constraint graph context, when an assignment statement of the form i=j+c is encountered, edges leading to vertex i are incremented by c, and edges emanating from vertex i are decremented by c. Then, the edges leading to vertex i are removed and set to lead to vertex j, unless j≠i and the edge already exists with a smaller weight. Similarly, edges emanating from vertex i are removed and set to emanate from vertex j, unless j≠i and the edge already exists with a smaller weight.

Thus, the constraint graph before supergraph node 11: top——is obtained by incrementing a 0 edge from vertex $ to vertex top by −1. The constraint graph before incrementing the edge is identical to graph 100, shown in FIG. 9, and the constraint graph after incrementing by top=top+(−1) is identical to graph 102.

The statement i=c is handled similarly to i=j+c, wherein vertex 0 plays the role of vertex j.

Termination of the algorithm is accelerated by "widening," i.e., by deliberately losing some information, as is known in the art of program analysis. Preferably, such widening takes the strongest implied constraints from an earlier visit to a supergraph node (which is the target of a backedge, i.e., an edge from a node to one of its ancestors in a depth-first spanning tree of the supergraph, as described in the above-mentioned book by Muchnick) that remain true in the current visit of supergraph node.

Preferably, the liveness information is used to partially interpret certain program conditions in a number of predefined cases (although care must be taken in the interpretation, since nodes of supergraph 50 are visited in a backward direction). For example, conditions of the form i<j+c are handled by first creating a graph having one c edge from vertex i to vertex j, and then integrating it with the liveness information along a true edge at the particular node. Another graph is created having one −(c+1) edge from vertex j to vertex i, and then integrating it with the liveness information along a false edge. Finally, the two resulting constraint graphs are joined.

Although for the sake of brevity, constraint graph analyses are presented herein in detail with reference only to certain of the nodes in supergraph 50, those skilled in the art will readily understand how these methods are used to determine the constraint graphs for the remainder of the nodes of supergraph 50. Furthermore, although the particular sample program of Table I has been chosen by way of example to illustrate a preferred embodiment of the present invention, the application of the methods and principles of the present invention to programs of other types will readily be appreciated.

The identification of array memory leaks, using the program variable relations and liveness analysis described hereinabove, can be exploited in two ways for purposes of garbage collection (GC):

By automatically instrumenting the program with assignments to null at the appropriate places, as illustrated, for example, in Table II.

By providing information to a GC function for use at run time, so that it can determine the parts of an array that are alive.

The second of these alternatives is generally preferably, as it is likely to provide better performance, and no extra code is required during the execution of the program.

The output of the analysis described hereinabove includes a set of constraints associated with each program point, describing which sections of array stack[i] may be alive at that point. A constraint may depend on the instance and local variables of the class and may include simple functions applied to those variables, such as top−1 for the Stack class. Preferably, instance variable constraints that hold at all program points at which a thread can be stopped for GC are exploited for this purpose, and GC points are selected so that the "best" constraint holds. For example, such a constraint for the Stack class is that the elements of the stack array from 0 through top−1 are alive provided that there is no GC point between the beginning of pop and statement s (Table I). If a GC point were to be allowed in this interval, it would be necessary to use 0 through top as the constraint, which would be less exact.

The chosen constraints comprise information that is logically associated with a specific class. Thus, in a preferred embodiment of the present invention, the constraints are stored in the class data structure (or class object) together with other information specific to the class, as is known in the art, such as a method table and description of fields. If a class has more than one array as an instance variable, then it may also have constraints for each array, so that a set of constraints can be associated with each array field.

A class-wide flag is preferably set in the class structure to indicate that the class has at least one such array field. When a GC function (typically of either a mark-sweep or copying type, as are known in the art and described, for example, in the above-mentioned article by Wilson) encounters an object during its trace, it checks the class-wide flag in the object's class structure. If the flag is set, the garbage collector traces the arrays reachable from the object, limiting its trace of the arrays according to their associated constraints.

When an array is encountered before its encapsulating object, for example, if the stack array is encountered before its encapsulating Stack object, GC will trace the array without knowledge of its associated constraints. Thus, the benefits of the analysis are lost. Given the assumptions of the analysis described hereinabove (i.e., that the array is encapsulated by the class and cannot be passed as a parameter to a method of another class), this is unlikely to happen. An array without encapsulation will be encountered only if a thread is stopped for GC in the middle of the execution of a method of the class so that a pointer to the array is on the stack of the thread. Alternatively, to alleviate this problem, an array object may be annotated with bit flag, indicating that it is to be traced according to a constraint, and with a back-pointer to its encapsulating object.

Table VI, below, illustrates an example Java program, GCTest, which demonstrates the benefit of eliminating array memory leaks. The program creates a vector consisting of vector elements. Every element of an inner vector is initialized with reference to a large, newly-allocated object, and then this reference is immediately removed. Thus, running this example program with a version of the Java Vector class that has leaks may lead to an OutOfMemoryError exception. Although the standard Java Vector class has assignments to null for unused array elements in order to avoid array memory leaks, these null assignments are removed from the method "removeAllElements" in the special, "leaky" version of Vector that is used here.

TABLE VI

```
import java.util.Vector;
void GCTest() {
    Vector v={ new} Vector();
        for ( int i=0; i<100; i++) {
            Vector   tmpVec = new Vector(1);
                Object[] tmpObjVec = new Object[1000000];
                tmpVec.addElement(tmpObjVec);
                tmpVec.removeAllElements();
                v.addElement(tmpVec);
        }
}
```

In a preferred embodiment of the present invention, the program GCTest, or another program of similar effect, is used to test the effectiveness of a software element, such as a programming language, compiler or GC function, in detecting and dealing with memory leaks.

As noted hereinabove, it sometimes occurs that joining constraint graphs (or equivalently, constraint sets), may yield an overly-conservative set of constraints. To overcome this problem, two sets of constraint graphs are optionally maintained for certain program points (but preferably not more than two sets). This option increases the complexity of analysis and the time required to perform it, but can give a more accurate result.

As further noted hereinabove, constraint graphs may be applied to good effect when a relaxed compilation model is used, as proposed in the above-mentioned article by Budimlic et al. In this model, the compiler generates two copies of the code, one under the assumption that derived classes will be presented later, and a second with the assumption that the generated class will not be used for inheritance. In the latter case, in a preferred embodiment of the present invention, array liveness can be determined conservatively with the following relaxed assumptions:

Array A and its class field aliases are private or protected class fields.

Array A and its class aliases (class fields or class method local variables) are not passed as a parameter to a method, unless the method is a method of the declaring class.

In general, for a well-written class file, the assumptions (or the relaxed assumptions) should hold.

In general, the methods described hereinabove are applicable to memory management in a wide range of programming environments, and particularly to garbage-collected environments, including C and C++ with appropriate GC facilities, for example. Practical considerations, however, such as algorithm scalability and preciseness, make the present invention particularly useful with respect to the Java programming language, which in any case has automatic memory management facilities, typically GC.

It will be appreciated that the preferred embodiments described above are cited by way of example, and the full scope of the invention is limited only by the claims.

What is claimed is:

1. A method for memory management in execution of a program by a computer having a memory, comprising:

identifying in the program an array of array elements;

determining at a given point in the program a range of the elements within the array such that none of the elements in the array outside the range is alive at the point; and passing information regarding the determined range to a memory management function, so that memory locations are associated with the array elements responsive to the determined range.

2. A method according to claim 1, wherein identifying the array comprises identifying an array of elements which is indexed by a program variable, and wherein determining the range of the elements comprises finding a relation with respect to values of the program variable.

3. A method according to claim 2, wherein finding the relation comprises finding an inequality relationship governing possible values of the program variable at the given point in the program.

4. A method according to claim 3, wherein finding the inequality relationship comprises defining a constraint graph that determines a bound on permitted values of the program variable.

5. A method according to claim 2, wherein finding the relation comprises performing an analysis of relations of the program variable in the program in a forward direction relative to an execution sequence of the program.

6. A method according to claim 5, wherein performing the analysis comprises determining one or more relationships between the program variable and a constant.

7. A method according to claim 5, wherein performing the analysis comprises determining one or more relationships between the program variable and another program variable.

8. A method according to claim 5, wherein determining the range of the elements comprises performing a liveness analysis of the program in a backward direction relative to an execution sequence of the program.

9. A method according to claim 8, wherein performing the liveness analysis comprises determining at the given point in the program that a first element in the array, indexed by a first value of the program variable, is not alive at the given point, and wherein performing the analysis of program variable relations comprises finding a relation at the given point in the program, such that if the first element is not alive at the given point, then at least one second element in the array, indexed by a second value of the program variable related by the program variable relations to the first value, is also determined not to be alive at the given point.

10. A method according to claim 9, wherein passing the information comprises informing the memory management function that both the first and the second elements are not alive.

11. A method according to claim 8, wherein performing the analysis of program variable relations comprises defining a constraint graph that determines a bound on permitted values of the program variable at the given point in the program, and wherein performing the liveness analysis comprises adding a constraint to the constraint graph with respect to liveness of the elements to which the program variables correspond.

12. A method according to claim 1, wherein finding the range of the elements comprises performing a flow analysis of the program so as to identify one or more live ranges of the array, wherein an element within the one or more ranges is alive at the given point in the program if there is an execution sequence using the element in the program following the given point, and there is no assignment of the memory location assigned to the element intermediate the given point and the use of the element by the execution sequence.

13. A method according to claim 12, wherein identifying the one or more live ranges comprises performing a data flow analysis of the program in a backward direction relative to the execution sequence.

14. A method according to claim 1, wherein the array elements comprise references to objects used in the program.

15. A method according to claim 14, wherein the program comprises a program module, which is called by another program module, and wherein the references are indexed by program variables that are substantially encapsulated within the module.

16. A method according to claim 1, wherein passing the information comprises identifying elements in the array that are outside the range so that memory locations assigned thereto can be reclaimed by a garbage collection function.

17. A method according to claim 16, wherein identifying the elements outside the range comprises providing an explicit assignment of one or more of the elements to null responsive to the identification, so that the memory locations assigned to the one or more elements can be reclaimed during run time of the program.

18. A method according to claim 16, wherein identifying the elements in the array comprises providing to the garbage collection function an identification of the range of the elements, so that the garbage collection function will not trace at least some of the elements outside the range.

19. A method according to claim 18, wherein the program comprises a program module, which is called by another program module, and wherein passing the information comprises storing information identifying the range of the elements in a data field associated with the module.

20. A method according to claim 19, wherein the program module comprises a Java class, and wherein passing the information comprises setting a flag in a class data structure associated with the class to indicate that the information is available.

21. A method according to claim 19, wherein determining the range of the elements comprises analyzing the program module to find a range of live elements in the array while compiling the program module.

22. A method according to claim 21, wherein the program module comprises a Java program module, and wherein analyzing the program is performed by a Java compiler.

23. A method according to claim 22, wherein the Java compiler receives and compiles Java source code.

24. A method according to claim 22, wherein the Java compiler receives and compiles Java byte code.

25. A method for program execution, comprising:
receiving code corresponding to a program module, which includes a data field containing information that identifies a range within an array of elements used in the program module such that at a specified point in execution of the program module, none of the elements in the array outside the range is alive;
running the code so as to assign memory locations to the elements in the array; and
reclaiming during run time of the code the memory locations assigned to at least some of the elements in the array that are outside the range, whereby the reclaimed locations may be assigned to other elements and a memory leak is prevented in the execution of the program.

26. A method according to claim 25, wherein receiving the code comprises receiving code in which a range of values of a program variable that indexes the elements in the array is identified.

27. A method according to claim 25, wherein receiving the code comprise receiving Java source code.

28. A method according to claim 25, wherein receiving the code comprise receiving Java byte code.

29. A method according to claim 25, wherein reclaiming the memory locations comprises actuating a garbage collection function.

30. A method for software verification, comprising:
creating an array of vectors, each vector comprising an array of vector elements;
adding a new vector to the array;
adding a new vector element to the new vector, such that a memory location is assigned to the element;
removing the element without explicitly assigning the element to null;
repeating the steps of adding a new vector, adding a new vector element to the new vector, and removing the element a given number of times, whereby a memory error that occurs due to repeating the steps is detected.

31. Programming apparatus, comprising:
a memory, which stores program code including an array of elements; and
a processor, coupled to read from and write to the memory, which finds at a given point in the program a range of the elements within the array such that none of the elements in the array outside the range is alive at the point, responsive to which range the processor manages the assignment of memory locations to the elements in the array during execution of the program code.

32. Apparatus according to claim 31, wherein the elements in the array are indexed by a program variable, and wherein the processor finds a relation with respect to the program variable so as to identify the range.

33. Apparatus according to claim 32, wherein the processor performs a variable relations analysis of the program in a forward direction relative to an execution sequence of the program so as to find the program variable relation.

34. Apparatus according to claim 33, wherein the processor performs a liveness analysis of the program in a backward direction relative to an execution sequence of the program.

35. Apparatus according to claim 34, wherein the array elements comprise references to respective objects used in the program.

36. Apparatus according to claim 31, wherein a garbage collection function reclaims at least some of the memory locations assigned to the elements in the array that are outside the range, whereby the reclaimed locations may be assigned to other objects so as to prevent memory leaks in execution of the program code.

37. Apparatus according to claim 36, wherein the program comprises a Java program, and wherein the processor analyzes the program to find the range of elements while compiling the program.

38. Apparatus for program execution, comprising:
a memory, which stores code corresponding to a program module, which includes a data field containing information that identifies a range within an array of elements used in the program module, such that at a specified point in execution of the program module, none of the elements in the array outside the range is alive; and a processor, which runs the code while assigning locations in the memory to the elements in the array, such that during run time, the memory locations assigned to at least some of the elements in the array that are outside the range are reclaimed, whereby the reclaimed locations may be assigned to other elements so that a memory leak is prevented in the execution of the program.

39. Apparatus according to claim 38, wherein the range within the array is identified by a program variable that indexes the elements in the array.

40. Apparatus according to claim 38, wherein the code comprises Java source code.

41. Apparatus according to claim 38, wherein the code comprises Java byte code.

42. Apparatus for software verification, comprising:
a memory, having a given size; and
a processor, coupled to read from and write to the memory, which creates an array of vectors, each vector comprising vector elements, and successively adds new vectors to the array and adds and then removes new elements to the new vectors a given number of times without explicitly assigning the removed elements to null, thereby to determine whether a memory error occurs due to an array memory leak.

43. A computer software product for detection of memory leaks in computer code defining a computer program, the product comprising a computer-readable medium in which are embedded computer-readable instructions in an executable file, which when read by a computer, cause the computer to identify in the program an array of elements and to find at a given point in the program a range of the elements within the array such that none of the elements in the array outside the range is alive at the point, and to pass information regarding the determined range to a memory management function, so that memory locations are associated with the array elements responsive to the determined range.

44. A product according to claim 43, wherein at least some of the memory locations assigned to the array elements outside the range are reclaimed by a garbage collection function.

45. A product according to claim 43, wherein the computer-readable instructions are associated with a compiler, which compiles the computer code.

46. A product according to claim 45, wherein the computer code comprises Java source code.

47. A product according to claim 45, wherein the computer code comprises Java byte code.

48. A product according to claim 45, wherein the computer-readable instructions belong to an embedded memory usage reduction component in a compilation library.

49. A product according to claim 45, wherein responsive to the information regarding the determined range, the compiler optimizes execution of the program.

50. A product according to claim 49, wherein the program comprises a Java class.

51. A product according to claim 43, wherein the instructions cause the computer to provide an output indicative of possible memory leaks in the program.

52. A product according to claim 43, wherein the instructions cause the computer to insert null assignments in the computer code so as to prevent memory leaks.

53. A computer software product for use in execution of computer code defining a program module, which module includes a data field containing information that identifies a range within an array of elements used in the program module such that at a specified point in the execution of the program module, none of the elements in the array outside the range is alive, the product comprising a computer-readable medium in which are embedded computer-readable instructions in an executable file, which when read by a computer, cause the computer to reclaim during the execution of the code memory locations assigned to at least some of the elements in the array that are outside the range, whereby the reclaimed locations may be assigned to other elements and a memory leak is prevented in the execution of the program.

54. A product according to claim 53, wherein the memory locations of the at least some of the elements outside the range are reclaimed by a garbage collection function.

55. A product according to claim 53, wherein the product comprises a Java run time facility.

56. A product according to claim 55, wherein the program module comprises a Java class.

57. A product according to claim 55, wherein the product comprises an embedded component in a Java Virtual Machine.

58. A computer software product, comprising a Java language class embedded in a computer-readable medium, the class containing computer-readable data, including a data structure in which information specific to the class is stored, the data in the structure including a data field containing information that identifies a range within an array of elements used in the class, such that at a specified point in execution of the class, none of the elements in the array outside the range is alive, and such that when a computer on which a Java Virtual Machine is running reads the data in the class, the information in the data field causes the computer to reclaim memory locations assigned to at least some of the elements in the array that are outside the range, whereby the reclaimed locations may be assigned to other elements and a memory leak is prevented in execution of the program.

* * * * *